Dec. 22, 1925.
R. DE S. SANTOS
1,566,381
SHOCK ABSORBER
Filed March 24, 1925
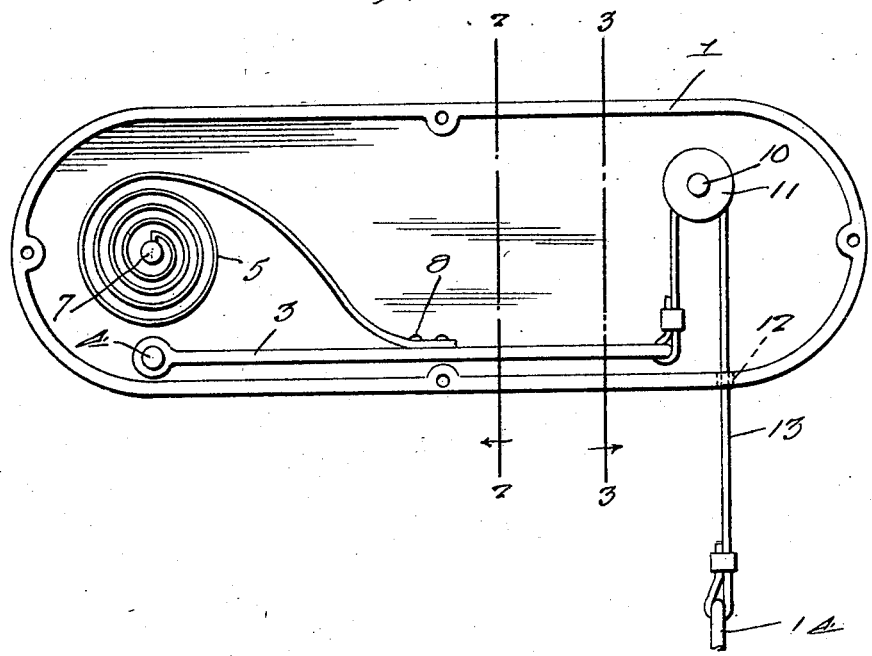
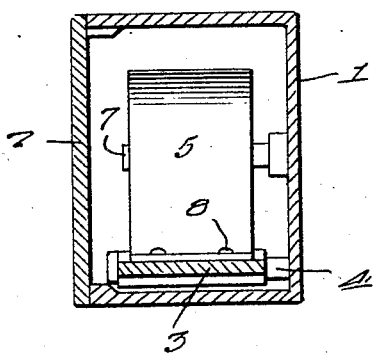
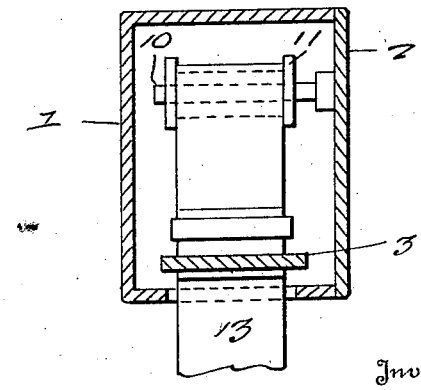
Inventor
R. de S. Santos
By Clarence A. O'Brien
Attorney Patented Dec. 22, 1925.

1,566,381

UNITED STATES PATENT OFFICE.

RAYMUNDO DE SOUZA SANTOS, OF PHILADELPHIA, PENNSYLVANIA.

SHOCK ABSORBER.

Application filed March 24, 1925. Serial No. 17,975.

*To all whom it may concern:*

Be it known that I, RAYMUNDO DE SOUZA SANTOS, a citizen of Brazil, residing at Philadelphia, in the county of Philadelphia and State of Pennsylvania, have invented certain new and useful Improvements in Shock Absorbers, of which the following is a specification.

The present invention relates to a shock absorber and aims to provide a device of this nature which is particularly useful in motor vehicles, such as automobiles, for preventing excessive rebound of the springs as the vehicle travels along rough ground.

The principal object of the invention is to provide a shock absorber of this nature, which will require little or no attention and which will be efficient and reliable in absorbing the shock and preventing too speedy a rebound of the spring with which it is associated.

Another important object of the invention is to provide a shock absorber of this nature which may be inexpensively manufactured, and yet will be strong, durable, simple in construction, and well adapted for the purpose for which it is designed.

With the above and numerous other objects in view, as will appear as the description proceeds, the invention resides in certain novel features of construction, and in the combination and arrangement of parts as will be hereinafter more fully described and claimed.

In the drawing:

Figure 1 is an elevation of the shock absorber embodying features of my invention, showing the cover plate of the casing removed.

Figures 2 and 3 are transverse sections taken on the lines 2—2 and 3—3 respectively of Figure 1, looking in the direction of the respective arrows.

Referring to the drawing in detail, it will be seen that 1 designates an oblong casing, which may be closed by the cover 2, in any suitable manner. A lever 3 is pivoted in the bottom, at one end of the casing, as at 4. A coil spring 5 has its inner end fixed to the pin 7 projecting from one side of the casing, while its outer end is extended and fixed as at 8 to an intermediate portion of the lever 3 and tends to hold this lever normally parallel with the longitudinal dimension of the casing. A pin or shaft 10 projects from the side of the casing, in the end thereof opposite to that in which is disposed the pin 7, and has rotatably mounted a spool or bobbin 11. An opening 12 is provided in the bottom of the casing, so that a strap 13 or other flexible member may be inserted therethrough and trained over the spool 11 and fixed to the end of the lever 3. The outer end of the strap is adapted to be fixed to a bracket 14, which will be mounted on the axle of the vehicle, while the casing 1 will be mounted on the chassis of the vehicle. It will therefore be seen that if the spring mounting the chassis on the axle tends to expand beyond its normal expansion, the strap 13 will be pulled so as to swing the lever 3 upwardly, thereby placing the spring 5 under tension. Thus, the shock will be absorbed and an excessive movement upwardly of the chassis from the axle will be slowed up and absorbed.

It will be apparent from the above that the preferred embodiment of the invention what I have disclosed in the detail has merely been given by way of example and that the same obtains all of the features of advantage enumerated as desirable in the statement of the invention and the above description. It will be further apparent that various changes in the details of construction and arrangement of parts may be resorted to, without departing from the scope or spirit of the invention as hereinafter claimed or sacrificing any of its advantages.

Having thus described my invention, what I claim as new is:

1. In a shock absorber, a casing, a lever fulcrumed in the casing, spring means associated with the lever for holding it in a predetermined position, a pulley mounted in the casing, a strap trained over the pulley and attached at one end to the lever, said casing, adapted to be mounted on the chassis of a vehicle and the free end of said strap adapted to be fixed to the axle of a vehicle.

2. A shock absorber of the class described including a casing, a lever fulcrumed in the casing, a spring of the coil type having its inner end fixed to the casing and its outer end fixed to an intermediate portion of the lever for holding said lever normally in a predetermined position, a spool mounted in the casing, a strap attached at one end to the free end of the lever and trained over the pulley and extending through an opening in the casing.

In testimony whereof I affix my signature.

RAYMUNDO DE SOUZA SANTOS.